United States Patent
Segre

(10) Patent No.: US 9,430,757 B2
(45) Date of Patent: Aug. 30, 2016

(54) RICH PERSONALIZED COMMUNICATION CONTEXT

(71) Applicant: Genesys Telecommunications Laboratories, Inc., Daly City, CA (US)

(72) Inventor: Paul Segre, Sonoma, CA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 113 days.

(21) Appl. No.: 13/802,642

(22) Filed: Mar. 13, 2013

(65) Prior Publication Data

US 2014/0282135 A1    Sep. 18, 2014

(51) Int. Cl.
| | |
|---|---|
| *G06F 9/44* | (2006.01) |
| *G06Q 10/10* | (2012.01) |
| *G06Q 30/02* | (2012.01) |
| *H04M 1/57* | (2006.01) |
| *H04M 3/42* | (2006.01) |
| *G06F 9/445* | (2006.01) |
| *G06Q 30/00* | (2012.01) |
| *G06Q 50/00* | (2012.01) |

(52) U.S. Cl.
CPC ............ *G06Q 10/107* (2013.01); *G06F 9/4443* (2013.01); *G06F 9/4446* (2013.01); *G06F 9/4451* (2013.01); *G06Q 30/01* (2013.01); *G06Q 30/0281* (2013.01); *G06Q 50/01* (2013.01); *H04M 1/576* (2013.01); *H04M 3/42068* (2013.01)

(58) Field of Classification Search
CPC . G06F 9/4446; G06F 9/4451; G06Q 30/0281; H04M 1/576; H04M 3/42068; H04M 3/4211
USPC .......................................................... 715/764
See application file for complete search history.

(56) References Cited

U.S. PATENT DOCUMENTS

| | | | | |
|---|---|---|---|---|
| 6,157,915 A | * | 12/2000 | Bhaskaran | G06Q 10/063 705/1.1 |
| 7,085,257 B1 | * | 8/2006 | Karves | H04M 3/42093 370/352 |
| 7,836,403 B2 | * | 11/2010 | Viswanathan | G06F 9/4443 379/142.01 |
| 8,526,072 B2 | * | 9/2013 | Singh et al. | 726/26 |
| 8,719,280 B1 | * | 5/2014 | Paglia | G06F 17/30386 707/732 |
| 8,918,421 B2 | * | 12/2014 | McCormack | G06Q 30/01 707/770 |
| 2004/0015729 A1 | * | 1/2004 | Elms et al. | 713/201 |
| 2004/0216039 A1 | * | 10/2004 | Lane | G06F 17/24 715/229 |
| 2005/0074107 A1 | * | 4/2005 | Renner | H04M 3/42042 379/202.01 |
| 2005/0076013 A1 | * | 4/2005 | Hilbert | G06Q 10/10 |

(Continued)

OTHER PUBLICATIONS

*Contact Me My Way, Give Your Friends the Means to Communicate With You*, Alcatel-Lucent Bell Labs, Alcatel-Lucent Innovation Days, Dec. 2008, 1 page.

*Primary Examiner* — Alvin Tan
(74) *Attorney, Agent, or Firm* — Lewis Roca Rothgerber Christie LLP

(57) ABSTRACT

A method for displaying context information on a user device, the method includes: identifying a triggering event associated with a contact; identifying a user associated with the user device; identifying a personalized configuration profile is based on at least one of an attribute of the contact attribute or an attribute of the user; identifying the context information associated with the personalized configuration profile; and retrieving the context information for displaying on the user device.

20 Claims, 6 Drawing Sheets

(56) References Cited

U.S. PATENT DOCUMENTS

| | | | | |
|---|---|---|---|---|
| 2006/0026248 A1* | 2/2006 | Bauchot | ............... | G06Q 10/107 709/206 |
| 2006/0259983 A1* | 11/2006 | Sperry | ................ | G06F 21/6245 726/28 |
| 2008/0114758 A1* | 5/2008 | Rupp et al. | ................... | 707/705 |
| 2008/0144804 A1* | 6/2008 | Mergen | ......................... | 379/266 |
| 2009/0016506 A1* | 1/2009 | Brown et al. | ............ | 379/112.01 |

* cited by examiner

RICH PERSONALIZED COMMUNICATION CONTEXT

FIELD

Embodiments of the present invention are directed to systems and methods for providing a rich personalized communication context for engaging with another entity.

BACKGROUND

Traditionally, user-to-user communication solutions have generally lacked rich personalized communication context. For example, in the case of telephony communication in a contact center, automatic number identification and more advanced services such as Telnic (.tel domain) enable the display of limited customer information (such as a contact's name, phone number, address, etc.) to the agent who is engaged in an interaction with a customer. However, the type of data displayed to the servicing agent as well as the source of the data and the viewing layout of the agent's display is often fixed and not customizable based on the communication context and the current role of the communicating parties. Existing solutions to enrich communication experience generally focus on the caller by, for example, exposing additional contact information of the callee, or on the callee by, for example, providing screen-pops to contact center agents. These solutions are also often restricted to a particular media type—mainly voice calls.

What is desired is a system and method for a user, whether as the initiating or receiving party, in any communication context (including both enterprise and non-enterprise environments) to access context information that may be tailored to the communication media used, the role of each of the communicating parties, the time of the communication and/or other context criteria in both live and offline interactions.

SUMMARY

According to one embodiment, a method for displaying context information on a user device, the method may include: identifying a triggering event associated with a contact; identifying a user associated with the user device; identifying a personalized configuration profile is based on at least one of an attribute of the contact attribute or an attribute of the user; identifying the context information associated with the personalized configuration profile; and retrieving the context information for displaying on the user device.

The method may further include displaying the context information on the user device.

The context information may be included in a dashboard.

The contact may be associated with a pre-stored record including a plurality of attributes of the contact, wherein the pre-stored record is accessible to the user device.

The attribute of the contact may include any one of a name, a photograph, an address, a telephone number, an email address, or a business value.

The attribute of the user may include any one of an identity of the user, a role of the user, an identification of the user device, a geolocation of the user, or a confidentiality clearance level.

The triggering event may include detection of the attribute of the contact.

The detection of the attribute of the contact may be prompted by an incoming communication from the contact or outgoing communication to the contact including voice call, voicemail, electronic mail, chat, or SMS.

The personalized configuration profile may be customizable by the user.

The personalized configuration profile may include selecting from one or more personalized configuration profiles based on a configuration rule associated with at least one of an attribute of the contact or an attribute of the user.

The configuration rule may be further associated with one or more items including, a time parameter, a date parameter, The context information excludes any information having a confidentiality level exceeding the confidentiality clearance level of the user.

The user device may be a dedicated device for displaying the context information and may be different from a device used to interact with the contact.

According to one embodiment of the present invention, a system for displaying context information on a user device, the system including a processor and a memory, wherein the memory has stored thereon instructions that, when executed by the processor, cause the processor to: identify a triggering event associated with a contact; identify a user associated with the user device; identify a personalized configuration profile based on at least one of an attribute of the contact or an attribute of the user; identify the context information associated with the personalized configuration profile; and retrieve the context information for displaying on the user device.

The system further causes processor to display the context information on the user device.

The system further causes the processor to send context information to another user.

The triggering event may include detection of the attribute of the contact prompted by an incoming communication from the contact or outgoing communication to the contact including voice call, voicemail, electronic mail, chat, or SMS.

These and other features, aspects, and advantages of the present invention will be more fully understood when considered with respect to the following detailed description, appended claims, and accompanying drawings. Of course, the actual scope of the invention is defined by the appended claims.

DETAILED DESCRIPTION

Figure 1:
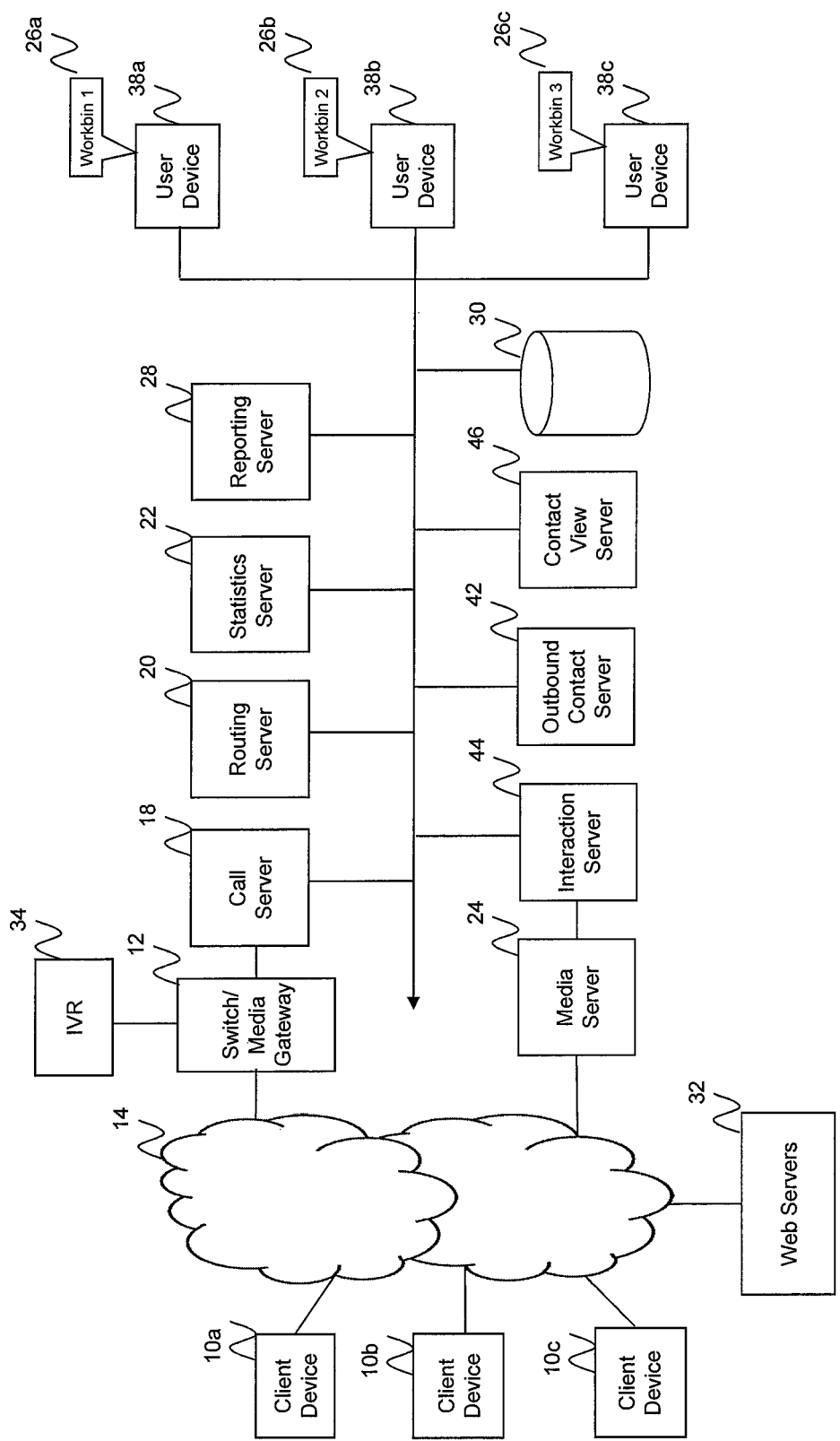
FIG. 1 is a schematic block diagram of a system supporting a contact center that is configured to route incoming and outgoing customer activities to customer service agents, according to one exemplary embodiment of the present invention.

In the following detailed description, only certain exemplary embodiments of the present invention are shown and described, by way of illustration. As those skilled in the art would recognize, the invention may be implemented in many different forms and should not be construed as being limited to the embodiments set forth herein. Like reference numerals designate like elements throughout the specification.

In general terms, embodiments of the present invention are directed to a system and method for providing a user customized, context-rich information pertaining to the party he/she is communicating with. The user may be a private user or a business/enterprise user. The user may customize/personalize the selection and/or organization of information displayed as well as the media that the data is displayed upon, according to an embodiment of the present invention. In an aspect, the information may be presented on the user's device in the form of a customizable dashboard or screen pop. In an illustrative example, when a senior management officer (e.g. a chief executive officer (CEO)) receives a phone call from a client, a personalized dashboard may appear on the officer's device to display, for example, client contact information (such as name of the caller, name and type of the client organization, position of caller within the organization, etc.), a summary of the client's relevant public financial data, a summary of the business relations with the client including the past dealings, nature and length of past dealings, sales made or services rendered to the client, other relevant information such as regional sales data, as well as any personal notes about the client such as upsell potential of the client, and/or the like. Such information may provide a rich backdrop which the officer may use to effectively engage the client and further the business interests of the officer's organization. In this example, the officer may be able to customize the content provided by the dashboard to suit the particular client and create other customizations for other clients or group of clients, as may be appropriate. Each customization may be stored in the system as a display profile (also referred to as a "personalized configuration profile") and may be invoked when interacting with the corresponding client(s).

According to one embodiment of the present invention, the dashboard may be invoked when the device "senses" a known contact (also referred to as a "sense" or "trigger" event). For live interactions, a trigger may include, for example, incoming interaction such as a voice call, email, short message system (SMS), chat, or the like, from the contact, or user-initiated outgoing interactions with the contact. In an "offline" interaction scenario, a trigger may include, for example, access to archived electronic records of interactions with the contact and/or other electronic records that contain a reference to the contact (such as documents, emails, webpages, or the like). However, according to one embodiment, the records may also be in print form, in which case a trigger event may occur when the user employs a device such as, for example, an agent desktop or a smart phone to manually input (or select from a list) the contact identification. In one embodiment, the user may use a device (such as a smart phone, mobile tablet or PC, scanner, or the like) to digitally capture (e.g. scan or take a picture of) a tangible document containing a reference to the contact and employ an automatic process, such as optical character recognition (OCR) and/or facial recognition, to identify the contact and thus invoke a custom dashboard.

According to one embodiment, the information provided by the dashboard/screen pop may be customized by the user and stored in the system as a display profile/personalized configuration profile. In one aspect, a user may create more than one profile, each customized for use in a particular context. For instance, a user may create a different display profile for each of the business roles that he/she serves. As an example, a supervisor who occasionally also acts as a technical assistance specialist may have separate profiles that he/she may use based on the function being served. A user may employ different profiles depending on the type of interaction he/she is having with a contact. For example, separate display profiles may be used for each of inbound, outbound, and offline interactions. In one aspect, a user may create different display profiles for each of his/her display devices. For example, the display profile associated with a smartphone might be customized to show less information than that associated with a desktop computer. According to some embodiments, time and geographical location may also influence the need for multiple profiles. For example, end of fiscal quarter may trigger a "sales" profile and an interaction occurring in a public location may prompt a "public" profile that hides sensitive or confidential information from view. According to one embodiment, the system may define a standard palette of profiles (templates) from which the user may choose and further customize as may be necessary.

According to one embodiment, the system may automatically display the appropriate profile according to one or more configuration/display rules that may be defined based on, for example, the triggering event, the display device used, and/or circumstances such as time of the trigger event and location of the user. According to one aspect, once a dashboard is automatically selected and displayed, the user may have the option of selecting a different profile if he/she deems fit. According to another embodiment, upon detecting a trigger event, the system may prompt the user to select a profile from a list of available profiles.

According to an exemplary embodiment, the context information screen pop/dashboard may be displayed on a device that a user is actively using to interact with the contact or the outside world (hereinafter referred to as an "interacting device"). For example, if the user is employing a desktop computer to browse the World Wide Web, read emails, and/or engage in online chat, the context information may be displayed on the same computer screen; or if user is employing a smartphone or other mobile device, the context information may appear on the same mobile device. In another embodiment, the dashboard may appear on a dedicated or non-dedicated device irrespective of whether it is used as an interacting device or not. For example, if the triggering interaction occurs through a desktop computer or a desk phone, the dashboard may appear on a smartphone or other device that is designated as the dedicated dashboard device. In one aspect, a user, who has multiple devices (such as a desktop computer, smartphone or mobile tablet, etc.) capable of displaying dashboards, may be able to switch from a designated device to another preferred display device for showing the dashboard. In such a case, if the switched-to device is associated with a particular display profile, the system may accordingly update the display profile. In another embodiment, upon a triggering event, the user may be prompted to select his/her device of choice for displaying the customer information, in which case the system may automatically select the appropriate display profile for displaying the context information on that device.

According to one embodiment of the present invention, information that is displayed by the dashboard may be designated as private or public by the user. Private data may only be viewable by the user and other authorized people, while public information may be generally accessible by all users who wish to view the context information. For example, most financial data about a client may be made public while personal notes about how to engage a client at the next sales call may be kept private and only viewable by the author user.

According to one aspect of the present invention, each piece of context information may be associated with a confidentiality level. Accordingly, a user may be granted a confidentiality clearance level permitting the user to access confidential information according to his/her clearance level. For example, a high level employee such as a vice president of sales or a CEO may assume a higher clearance level than a low level knowledge worker. According to one embodiment, the dashboard may adopt a color coding scheme to visually mark confidential information and identify its level of confidentiality. In one aspect, the same color scheme may be employed to identify the clearance level of users. In addition to filtering access to information, confidentiality classification may, for example, help inform a user of what data to share with others. For example, in a conference call with a client to discuss current business dealings, each of the multiple users in attendance may have his/her own personalized dashboard displaying relevant client information, which may be color-coded to indicate the content's level of confidentiality. Additionally, all attendees may be able to view the clearance level of all other attendees. In this example, the lowest confidentiality clearance level may define the appropriate threshold (or cut-off point) for subjects of discussion.

In addition to concurrent access to context information by multiple users, the system may also support concurrent update of contact data by multiple users. For example, in the case of a passive user (such as contact center administrator) monitoring a live interaction between another user (e.g. a knowledge worker) and a contact, any additions to the interaction data (such as the agent's disposition notes) can be readily pushed to the passive user's display device as updates.

According to one embodiment, a user may transfer the context information accessible through his/her dashboard to another party. In one aspect, a user may select the receiving party's clearance level and any content requiring higher clearance may automatically be stripped before delivery. In one embodiment, if the receiving party is an existing user with a known clearance level, the system may redact information without the need for the sending user to select the receiving party's clearance level.

The embodiments of the present invention described below may be deployed in an enterprise setting, for example, a contact center, supporting full dashboard capability, and/or may be available to private users who may access all or a subset of the capabilities described herein through connectivity with back-end enterprises components. Those of skill in the art will appreciate, however, that all or a subset of the components and functionalities described herein may be implemented in a standalone device such a mobile phone or tablet.

FIG. 1 is a schematic block diagram of a system' supporting a contact center that is configured to route incoming and outgoing customer activities to customer service agents, according to some exemplary embodiments. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to some exemplary embodiments, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other external entities desiring to receive services from the contact center may initiate inbound interactions with the contact center via their client devices 10a-10c (collectively referenced as 10). Each of the client devices 10 may be a communication device conventional in the art, such as, for example, a telephone, wireless phone, smart phone, personal computer, electronic tablet, and/or the like. Customers operating the client devices 10 may initiate, manage, and respond to telephone calls, emails, chats, text messaging, web-browsing sessions, and other multi-media transactions. In this regard, the client devices 10 may be equipped with a web browser or other like application for accessing information over the World Wide Web.

Inbound and outbound interactions from and to the client devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between customers and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server 24 for engaging in media interactions other than voice interactions with the client devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which a customer may subscribe, such as, for example, Facebook, Twitter, LinkedIn, Pinterest, and the like. The web servers may also provide web pages for the enterprise that is being supported by the contact center. Customers may browse the web pages and get information about the enterprise's products and services. The web pages may also provide a mechanism for contacting the contact center, via, for example, web chat, voice call, email, web real time communication (WebRTC), or the like.

According to some exemplary embodiments of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the incoming interaction, henceforth referred to as incoming customer activity, is to be routed to an agent, the call server 18 will interact with a routing server 20 for finding the most appropriate agent for processing the incoming activity. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the call server 18 may also query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The call server 18 may query the customer information from the customer database via an ANI or any other information collected by the IVR 34. The information may then be relayed to the user device 38 of the agent who is processing the call.

In one example, while an agent is being located and until such agent becomes available, the call server 18 may place an incoming customer activity in, for example, a customer activity queue. The activity queue may be implemented via any data structure conventional in the art, such as, for example, a linked list, array, and/or the like. The data structure may be maintained, for example, in buffer memory provided by the call server 18.

Once an appropriate agent is available to handle a customer activity, the activity may be removed from the customer activity queue and transferred to a corresponding user device 38*a*-38*c* (collectively referenced as 38). Collected information about the customer and/or the customer's historical information from the customer database may also be provided to the user device for aiding the agent in better servicing the call. In this regard, each user device 38 may include a telephone adapted for regular telephone calls, VoIP calls, and the like. The user device 38 may also include a computer for communicating with one or more servers of the contact center and performing data processing associated with contact center operations and for interfacing with customers via a variety of communication mechanisms such as chat, instant messaging, voice calls, and the like.

The selection of an appropriate agent for routing an inbound or outbound customer activity may be based, for example, on a routing strategy employed by the routing server 20, and based on information about agent availability, skills, preferences, and other routing parameters provided, for example, by a statistics server 22.

According to some exemplary embodiments, the media servers 24 may be configured to detect user presence on different websites including social media sites, and may also be configured to monitor and track interactions on those websites.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to some exemplary embodiments of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may appear in the agent's workbin 26*a*-26*c* (collectively referenced as 26) as a task to be completed by the agent. The agent's workbin may be implemented via any data structure conventional in the art, such as, for example, a linked list, array, and/or the like. The workbin may be maintained, for example, in buffer memory of each user device 38.

According to some exemplary embodiments, in addition to storing agent preference data, the mass storage device 30 also stores data related to contact center operation such as, for example, information related to agents, customers, customer activities, and the like. The mass storage device may take form of a hard disk or disk array as is conventional in the art.

According to some exemplary embodiments, the system also includes an outgoing contact server (OCS) 42 for scheduling, initiating, and/or managing, outgoing interactions. For example, the OCS may store an outgoing contact list and may interface with the routing server 20 to enable an agent to partake in an outgoing activity to, for example, upsell current customers, solicit new businesses, seek donations for charitable organizations, or reach out to customers who have requested technical assistance. According to some embodiments, the OCS 42 may further interact with the IVR 34 for placing outgoing calls.

According to an exemplary embodiment, the system also includes a contact view server (CVS) 46 for displaying context-rich content related to a customer on a user device 38. The user device 38 may be any device that is connected to the system via, for example, a local area network (LAN), a wide area network (WAN), or internet, and may, for example, be a desktop computer or a mobile device (e.g. smart phone or tablet). According to one embodiment, the contact view server 46 monitors incoming and outgoing interactions between a user and an external entity (e.g. a customer) and triggers the display of an appropriate dashboard/screen pop on the user's device 38. The user may, in an enterprise setting, be, for example, an agent, an administrator, or a high-level management officer (e.g. CEO), and, in a non-enterprise setting, be a private user who is employing the functionality of the present invention.

The contact server may also scan any document or email that a user receives or views on any of his/her devices that are connected to the system for any reference to a known contact, and launch the dashboard if one is found. The contact view server may also retrieve relevant customer data from various infobases to display via the dashboard. An infobase may include, without limitation, an electronic repository that stores dynamic-reference-information that is primarily free-format or semi-structured and may store, for example, text and/or multimedia information which is full-text indexed, and multi-user editable. The infobase may also include traditional databases.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art will recognize that the functionality of various servers may be combined or integrated into a single server, or the functionality of a particular server may be distributed across one or more other servers without departing from the scope of the embodiments of the present invention.

Figure 2:
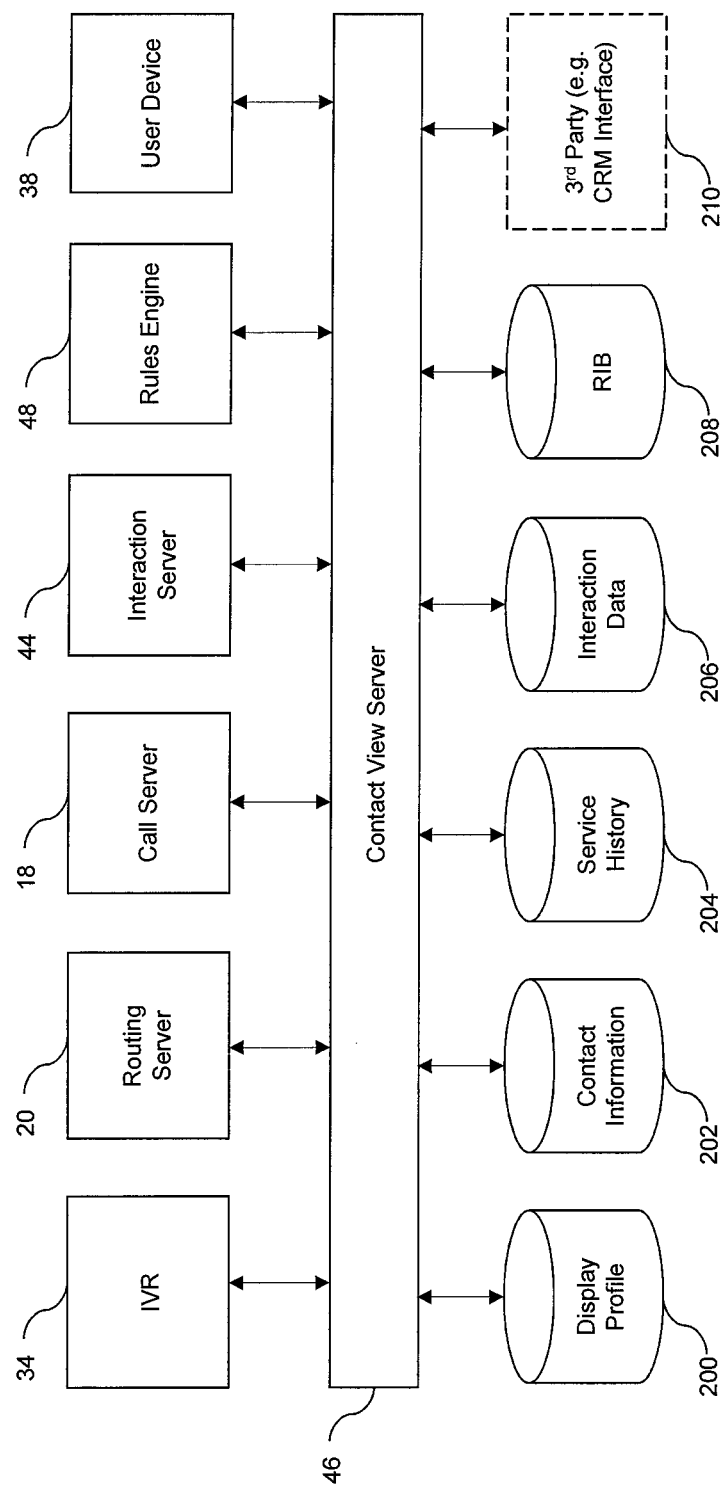
FIG. 2 is a detailed schematic block diagram of certain components of a system for supporting the display of context-rich content on a user device, according to one exemplary embodiment of the present invention.

FIG. 2 is a more detailed schematic block diagram of certain components of the system of FIG. 1 for supporting the display of context-rich content on a user device 38, according to some exemplary embodiments of the present invention. According to one embodiment, one or more processes running on the contact view server 46 may monitor different communication channels (such as voice or email) and proactively display context information each time there is a contact "sense" or trigger event. In some embodiments, the process may receive the signal to trigger the dashboard from the given contact channel such as email client or phone dialer. According to one embodiment, a contact sense may be detected by a server monitoring certain communication channels such as a call server 18 (for voice interactions) or interaction server 44 (for multi-media interactions).

In order to display an appropriate dashboard configuration and populate it with the necessary content, the contact view server 46 may draw upon a number of local infobases including, for example, a contact information database 202, a service history infobase 204, a interaction and dialogue history infobase 206, and the like. According to one embodiment, the local infobases may be stored on the mass storage device 30 and be operated by the CVS 46. According to an embodiment, a universal contact server (UCS) and/or a contact center's context services (CS) may also be employed to store information in and maintain the local infobases.

The CVS 46 may also retrieve some of the displayed information from external repositories such as third-party databases 208 and/or third-party customer relationship management (CRM) interfaces. As is commonly understood in the art, a CRM may be implemented for managing a company's interactions with customers, clients, and sales prospects. A CRM may involve organizing, automating, and synchronizing business processes such as, sales, marketing, customer service, and technical support activities, with the goal of maintaining and expanding the current pool of clients.

According to an embodiment, once a triggering event is detected, the contact view server 46 may retrieve the identity of the user who is assigned to interact with the client from the routing server 20 and retrieve an appropriate dashboard configuration from the profile infobase 200. The display profile infobase 200 may contain personalized configuration profile data for a user's one or more personalized display profiles, and/or a preset standard palette of profiles which a user may opt to use as his/her profile(s) or as templates for customizing his/her own personal profiles. The display profile infobase 200 may also contain a user's clearance level. In one embodiment, the user clearance levels may be stored on the contact view server 46. According to one embodiment, the rules engine 48 may store the display rules according to which a profile is to be selected for display on a user device 38. The display rules, which may be partly or entirely defined by the user, may be based on a number of parameters including, for example, the triggering event, the identification of the display device used, and/or circumstances such as time of the trigger event and location of the user.

According to an embodiment, once a dashboard configuration has been identified, the contact view server 46 may populate the dashboard with content retrieved from local and third-party infobases. In one aspect, the contact information database 202 may provide customer contact information (e.g. names, addresses, phone number, emails, etc.) and other contextual information (e.g. relevant news pieces and/or other information found on the web or links thereto). In one embodiment, contextual information may be inserted manually by a user after each new interaction, or when new information about the client becomes available. Manual data entry may be limited, for example, to a particular user or a subset of users. According to one embodiment, contextual information may be automatically gathered and stored. For example, by browsing the web or social media networks (such as Facebook, Twitter, Pinterest, etc.), the system may obtain up-to-date information on, for example, the number of Twitter followers or Facebook friends associated with a given contact. Such information may be automatically collected using a scheduled or event driven process, according to one embodiment of the invention. In one aspect, certain information may also be gathered in real-time in response to a user request to display context information (such as information about a contact's presence in social networks or current number of twitter followers). According to one embodiment, contact data may be time-stamped, indicating when the data was added or when it became effective, and obsolete data (as determined by preset criteria) may be removed or marked as such.

According to one embodiment, a dashboard may be able to provide a view a contacting client's historical data as well as real-time data on currently ongoing interaction between the client and one or more users. For example, the service history infobase 204 may, in the case of a customer service department, contain information about outstanding service requests by the customer, previous trouble tickets issued for the client, dispositions by the technical support staff, etc. Other data such as information on issued or requested licenses, products sold, payments received, etc. may be stored in separate databases (e.g. license and/or sale databases) or included in the service history database 204. Further, the interaction data infobase 206 may provide information about any past interaction the client has had with any user and/or any currently ongoing (also referred to as active or live) interaction. For example, a supervisor may monitor the interaction (e.g. a phone conversation, a live chat session, etc.) between a knowledge worker and a customer through his/her dashboard. In one embodiment, the contact view server 46 may interact with the IVR 34 allowing the user's dashboard to display, in real-time, a caller's responses to IVR questions.

According to one embodiment of the present invention, in addition to the above mentioned infobases, the contact view server 46 may obtain contextual information from other related infobases (RIBs) 208 containing related information. For example, an RIB 208 may include a business database, which may contain, for example, sale, marketing, and client financial data, or a CRM, which may contain, for example, information about the business value of a particular customer, short and long business strategy for dealing with the client, or the like.

According to one embodiment, the contact view server 46 may also receive information from third-party infobases and/or CRMs, such as the Oracle Siebel CRM or PeopleSoft CRM, or the Microsoft Dynamic CRM, all of which may manage their own infobases. A third party may, for example, be a social media network such as Facebook, Twitter, Pinterest, or the like.

According to some exemplary embodiments of the present invention, for a private user employing the dashboard functionality outside of an enterprise setting, the CIB 310 and RIB 208 may exemplify either dedicated user-operated and maintained solutions or services provided by a third party.

According to some embodiments, customer related information accessible by the CVS 46 may have an associated confidentiality level, which may restrict what a user can and cannot view. According to one embodiment, the confidentiality level of a record may be automatically assigned by the system according to a predefined rule. In one embodiment, the confidentiality level may be manually assigned by a system user. According to an exemplary embodiment, when a contact view server 46 retrieves information to display on a dashboard, the confidentiality level of the data may be checked against the clearance level of the user and data with confidentiality level not exceeding the user's clearance level is selected and displayed on the user's device 38.

Figure 3:
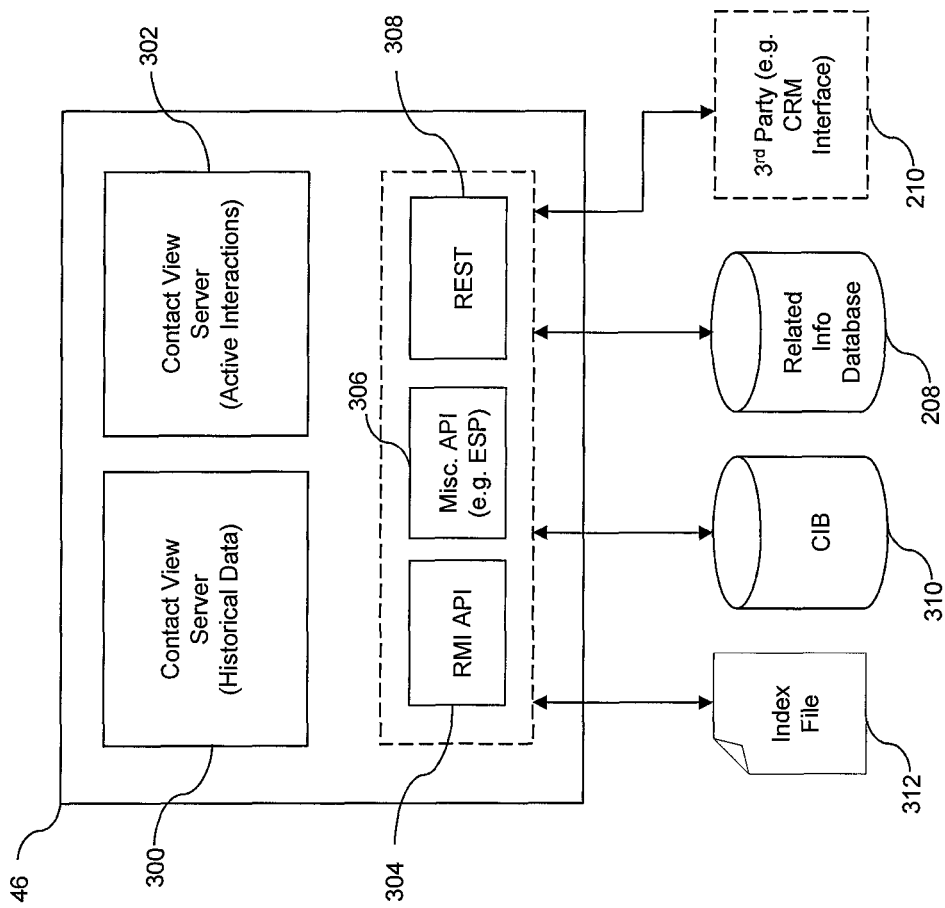
FIG. 3 is an representation of the contact view server running various application programming interfaces configured to interact with various infobases, according to one exemplary embodiment of the present invention.

FIG. 3 is an exemplary representation of the contact view server 46 running various application programming interfaces (APIs) configured to interact with various infobases. The contact view server may be conceptualized as having one module 300 for handling historical data, which are seldom changed (e.g. except for the occasional removal of obsolete data), and another module 302 for handling data related to active interactions, which may be retrieved and stored in real-time. An active interaction may include, for example, emails from a client that have not been responded to or a conversation in progress between a client and an agent.

Modules 300 and 302 may be implemented via computer program instructions that are stored in memory of the contact view server 46 and executed by a processor. A person of skill in the art should recognize that all or portions of the modules may also be implemented via firmware (e.g. ASIC), hardware, or a combination of software, firmware, and/or hardware. Furthermore, although the modules are depicted separately the function of the two modules may be merged.

Historical and active contact data may be sourced from various contact infobases (CIB) 310 such as the contact information database 202, the service history infobase 204, the interaction infobase 206, as well as related infobases 208 and third-party infobases 210. An index file 312 may be used to facilitate speedy retrieval of historical data.

The contact view server 46 may employ, for example, a Java remote method invocation (RMI) API 304 to facilitate communication with other servers and CIBs 310. Other APIs such as the external server protocol (ESP) 306 may also be employed as is common in multimedia deployments. The contact view server 46 may also use "Restful" APIs (i.e., services implemented using the principles of representational state transfer (REST)), to render particular instances of a dashboard upon a trigger event or to enable personalization and management of custom display profiles.

Figure 4:
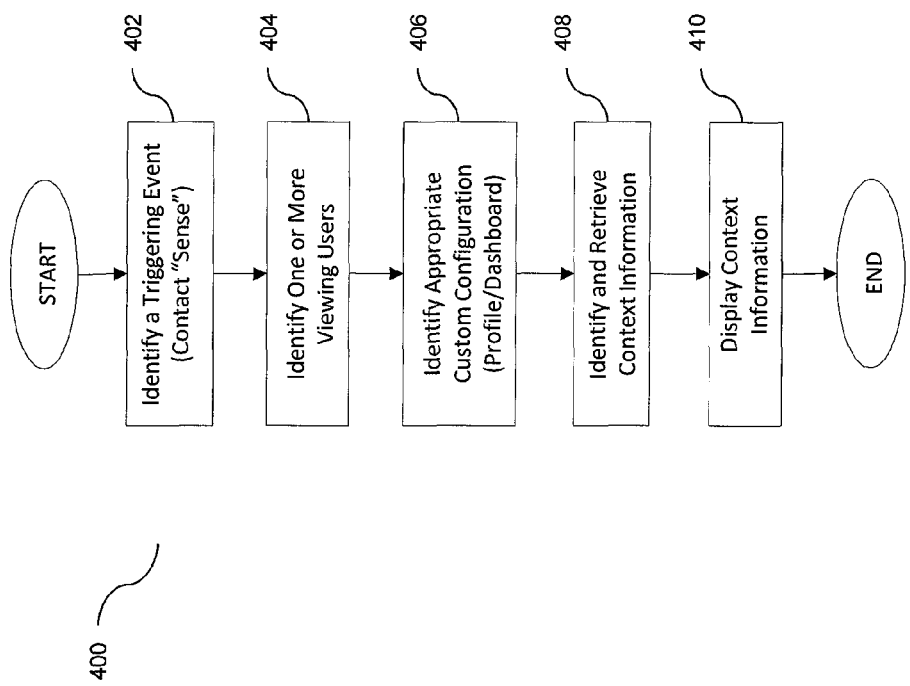
FIG. 4 is a flow diagram for the process of displaying a contact view dashboard upon detection of a trigger event, according to one exemplary embodiment of the present invention.

FIG. 4 is a flow diagram for the process of displaying a contact view dashboard upon detection of a trigger event (contact "sense"), according to an exemplary embodiment of the present invention. The process may be implemented by the module 300 and/or module 302 of the contact view server 46.

The process starts and in step 402, a trigger event (contact sense) is identified. The trigger event may be detected when, for example, a live or offline interaction prompts a query to the UCS or contact view server 46 for contact information, which yields a known contact. According to an embodiment, contact records may be stored in the contact information database 202. In a live interaction scenario, a contact sense may be triggered by, for example, an incoming interaction such as a voice call, voice mail, email, SMS, chat, or the like, from the contact, or user-initiated outgoing interactions with the contact. In an offline interaction scenario, a contact sense may be triggered by, for example, access to archived electronic records of interactions with the contact and/or documents, emails, webpages, or the like that contain a reference to the contact. According to one embodiment, the records may be in printed form, in which case a trigger event may occur when the user employs a device such as, for example, the agent desktop or a smart phone, to manually input or select from a list the contact identification. In one embodiment, the user may use a device (such as a smart phone, mobile tablet or PC, scanner, or the like) to scan or take a picture of a tangible document containing a reference to the contact and employ an automatic process such as optical character recognition (OCR) and/or facial recognition to identify the contact and thus prompt a trigger event.

In the case of a live interaction (e.g. incoming call or email), even if the contact is unknown (i.e. a query to the UCS or CVS 46 for the contact's information does not yield a matching record), a trigger event may still be recognized and the display rules may call for the invocation of, for example, a default display profile or an "unknown contact" profile in step 406.

In step 404, the contact view server identifies the one or more viewing users and their active display devices (e.g. user device 38). The viewing user may be an active user, such as a knowledge worker who is engaged in an interaction with a contact, or a passive user, such as a supervisor who is monitoring an interaction with the contact. There may be more than one active or passive viewing user as may be the case in a conference call with a client and multiple participants. According to an embodiment, the contact view server 46 may determine the identity of any passive users based in part by defined rules as provided by the rules engine 48. For example, in a contact center setting, an "escalation" rule may establish that if a particular (e.g. important) customer contacts the organization, a dashboard/screen pop should be displayed to the agent who is assigned to the interaction as well as his/her supervisor and/or a sales manager or the like.

In step 406, the contact view server 46 may identify the appropriate dashboard configuration for each of the viewing users. For each viewing user, the contact view server 46 may use a number of query terms including, for example, the identity of the contact, the identity of the user, the device being used to interact with the contact, the current time, the geo-location of the user, and/or the like, to craft a query to the rules engine 48 for any dashboard configuration rules. The location of the user may either be detected automatically by the system (e.g. via a global positioning system) or manually input to the system by the user. According to one example embodiment, in addition to or in lieu of the above, the contact view server query may include the confidentiality clearance level of the user and/or a pointer to any device that may be designated by the system or the user as the dedicated device for dashboard display. The information provided by the rules engine 48 may in turn be used to query the display profile infobase 200 to retrieve the appropriate profile configuration for display on the user device 38.

For example, if the user is a vice president of sales and timestamp of the trigger event indicates that it is near the end of the quarter, a profile rule may invoke the configuration of an end of quarter sales profile. Further, if the user location is indicative of the user being outside of the organization's premises, a rule may call for the display of a limited dashboard which hides sensitive information from view. As a further example, in an interaction with a high level officer from an important client organization, a profile display rule may invoke a dashboard that is tailored to that particular client. According to an embodiment, the queried rule may also call for the display of a "default" dashboard, which may, for example, be a customized profile so designated by the user or may be a predefined system default.

In step 408, the contact view server 46 retrieves dashboard content for each of the one or more viewing users from a host of local and third-party sources. According to an embodiment, sources of profile content may include, for example, the contact information database 202 (for basic contact information such as name, address, phone number, email address, or the like), the service history infobase 204 (for information on past or pending services), interaction data infobase 206 (for information on past and present interactions with the contact), other local related infobases 208 (such as sales or marketing databases, CRM, or the like), and third-party infobases 210. The content retrieved for each dashboard will be in accordance with the profile configuration identified in step 406. In step 410, for each of the one or more users, the contact view server 46 pushes the retrieved information to the user's dashboard for display.

According to an embodiment, in step 410, the contact view server 46 may check the confidentiality level of the data retrieved in step 408 and only display content that is within the viewing user's clearance level. In another aspect, the confidentiality check may occur at step 408 to exclude information not within a user's clearance level from retrieval.

Figure 5:
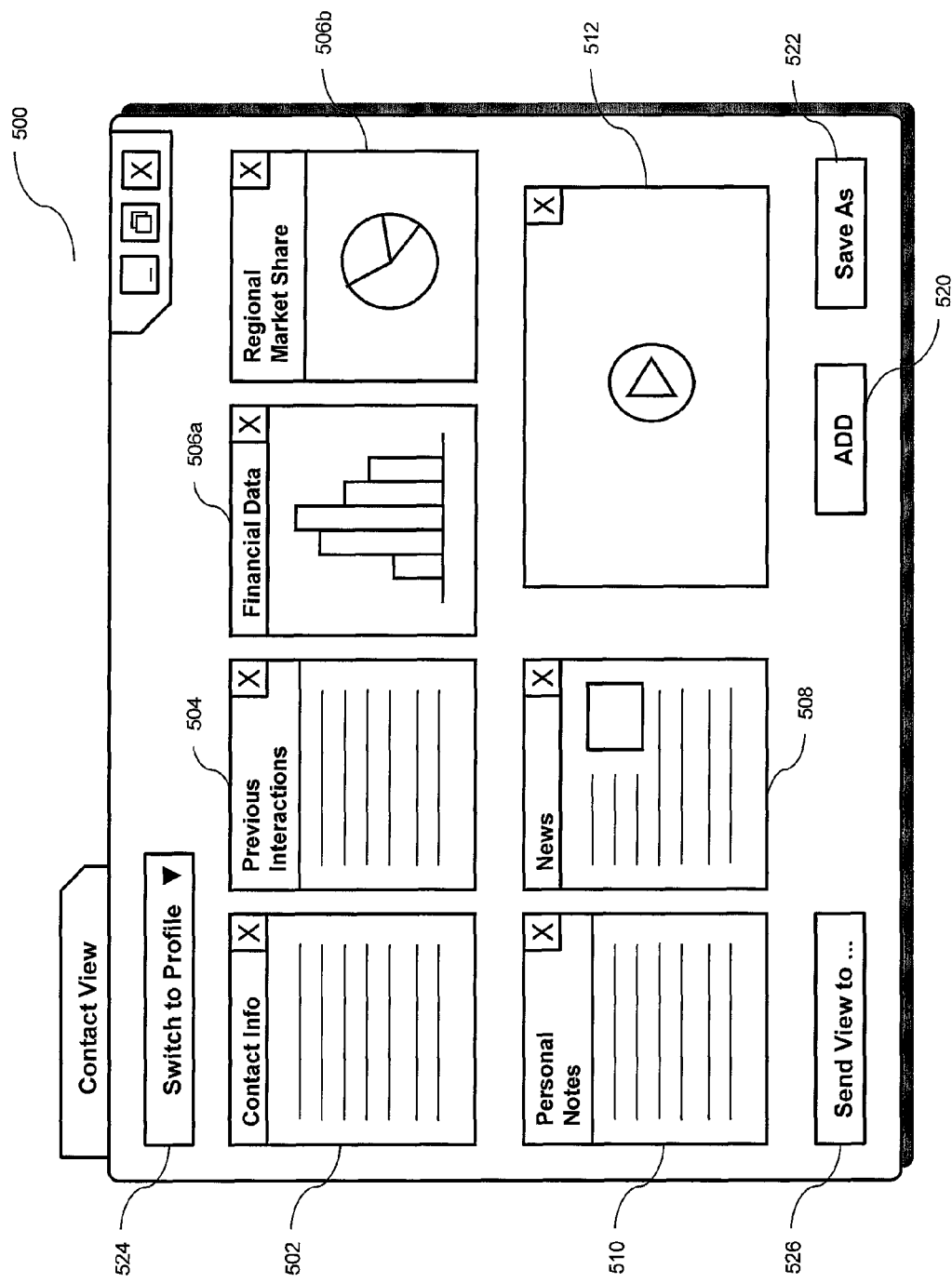
FIG. 5 is an exemplary representation of a contact view dashboard, according to one exemplary embodiment of the present invention.

FIG. 5 is an exemplary representation of a contact view dashboard 500, according to one embodiment of the present invention. The dashboard may be personalized to show a variety of relevant context information. For example, the dashboard may display views of the client's contact information 500, previous interactions with the client 502, relevant contextual information such as an organization's financial data 506a and regional market share 506b, relevant news pieces and or other information found on the web 508 (including links to blogs and/or news sources online), any personal notes about the client 510 (such as up-sell potential of the client or mental notes from previous interactions), and/or the like. The dashboard may also be capable of exposing audio/visual information 512. According to an embodiment, each piece of information may be marked (e.g. via a color coding scheme) to indicate its level of confidentiality.

The user may also be able to customize the dashboard by deleting certain content from the dashboard view or adding new content by, for example, toggling an "add" button 520, according to one embodiment of the invention. The user may be able to add content from any local or third-party content source including, for example, the contact information database 202, service history infobase 204, interaction data infobase 206, related infobases 208 (e.g. sales and marketing databases), third-party CRM 210, and/or the like. According to an embodiment, the user may be able to organize the information on the dashboard in any manner he/she may desire. Once a user is satisfied with the content and presentation of information on the dashboard, the user may be able to save the configuration by toggling a "save" button 522, which may prompt the contact view server 46 to store the configuration in the display profile infobase 200.

According to an embodiment, the user may also be able to switch between existing profiles by, for example, toggling a dropdown menu 520, which may display a list of profiles retrievable from the display profile infobase 200 that are available to the user.

According to an embodiment, the user may also be able to share a dashboard configuration with another user by toggling a "send view to" button 526. Toggling the button 526 may prompt the user to choose one or more users to send the personalized profile to. The receiving user may be able to view, personalize, and save the shared profile as he/she desires. In one aspect, toggling the "send view to" button may allow the user to send particular information to the dashboard of another user.

Figure 6:
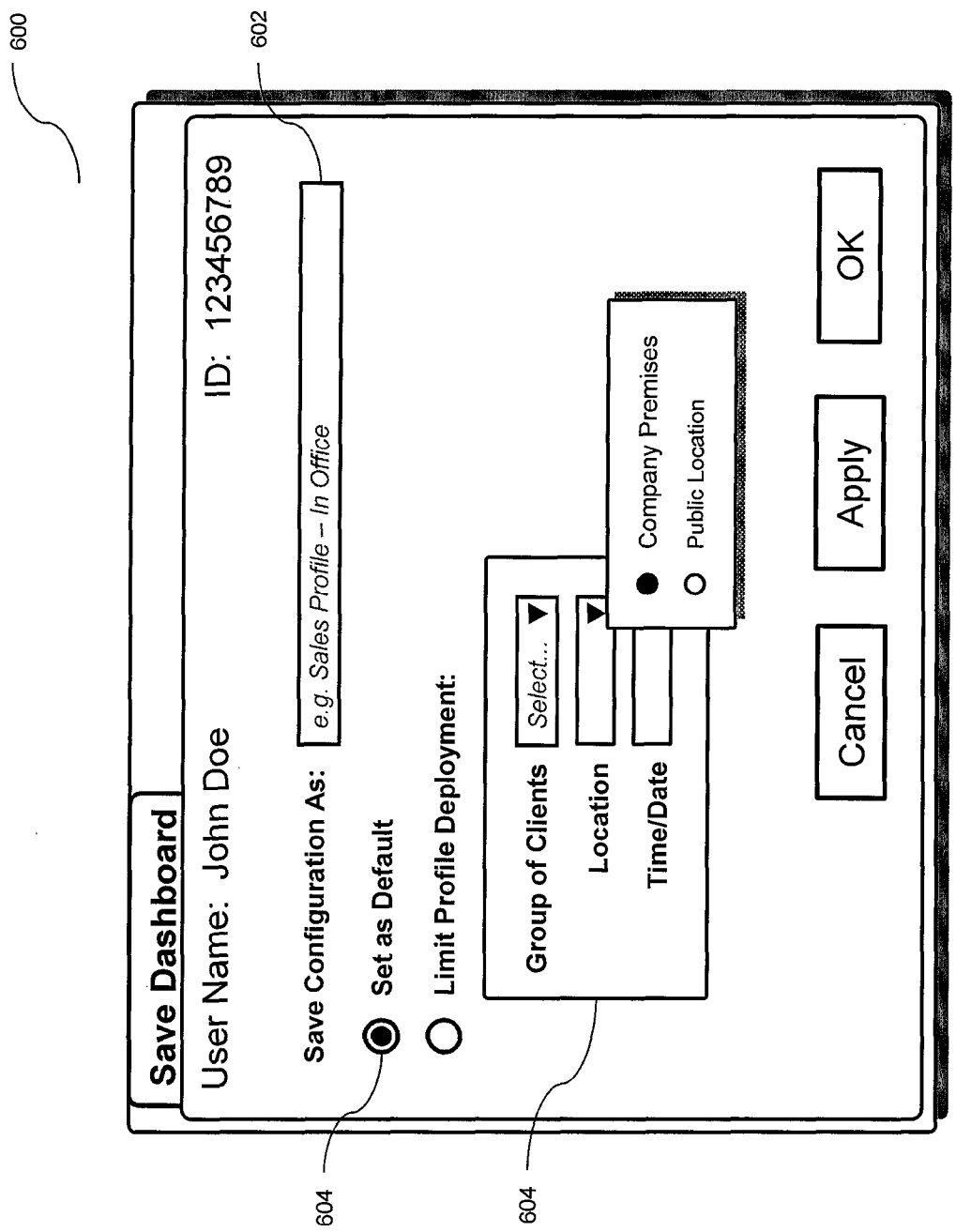
FIG. 6 is an exemplary embodiment of a dialog window that may be presented to the user upon saving a profile configuration, according to one exemplary embodiment of the invention.

FIG. 6 is an exemplary embodiment of a dialog window 600 that may be presented to the user upon saving a profile configuration, according to one embodiment of the invention. The user may be able to choose a name to save a configuration as by typing a name in the input box 602 (such as "Sales Profile—In Office"). According to one embodiment, the user may be able to designate a profile as a "default" configuration by, for example, toggling a radio button 604. In one aspect, the user may be able to limit the display of the profile by associating the profile with a particular client or group of clients, a location (such as "company premises" or "public location"), and/or time and date (e.g. end of quarter). The associations may define profile rules that may be stored in the rules engine 48. The user may be able to apply such settings via, for example, a group of dropdown menus 604.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for displaying context information on a user device accessible to a user, the method comprising:

identifying, by a processor, a triggering event associated with a contact;

identifying, by the processor, at least one of an attribute associated with the contact or the user;

selecting, by the processor, a display profile of a plurality of display profiles based on the identified attribute, wherein each of the plurality of display profiles is preset and stored in association with the user, and each of the plurality of display profiles define a display configuration, wherein the display configuration includes identification of a type of context information to be displayed to the user;

identifying, by the processor, the context information associated with the type of context information defined by the selected display profile;

retrieving, by the processor, the context information and displaying the context information on the user device according to the display configuration defined by the selected display profile;

customizing, by the processor, the display configuration of the selected display profile in response to a user command;

identifying, by the processor, a second display device accessible to the user;

selecting, by the processor, a second display profile of the plurality of display profiles for the second display device; and switching display of the context information from the user device to the second display device, wherein the context information is displayed on the second display device according to the display configuration defined by the second display profile.

2. The method of claim 1, wherein the context information is included in a dashboard.

3. The method of claim 1, wherein the contact is associated with a pre-stored record comprising a plurality of attributes of the contact, wherein the pre-stored record is accessible to the user device.

4. The method of claim 1, wherein the attribute of the contact includes at least one of a name, a photograph, an address, a telephone number, an email address, or a business value.

5. The method of claim 1, wherein the attribute of the user includes at least one of an identity of the user, a role of the user, an identification of the user device, a geolocation of the user, or a confidentiality clearance level.

6. The method of claim 1, wherein the context information excludes information having a confidentiality level exceeding a confidentiality clearance level of the user.

7. The method of claim 1, wherein the triggering event is user selection of a document or record associated with the contact.

8. The method of claim 1, wherein the triggering event is an incoming communication from the contact or outgoing communication to the contact, wherein the incoming or outgoing communication includes voice call, voicemail, electronic mail, chat, or SMS.

9. The method of claim 8, wherein the user device is a dedicated device for displaying the context information and is different from a device used to interact with the contact during the incoming or outgoing communication.

10. The method of claim 1, wherein the attribute is a time or date in which the triggering event is detected.

11. The method of claim 1, wherein each of the plurality of display profiles is associated with a different business role of the user, wherein the selected display profile is associated with the business role of the user when the triggering event is detected.

12. The method of claim 1, wherein a first one of the plurality of display profiles is associated with inbound, communications, and a second one of the plurality of display profiles is associated with outbound communications, wherein the selected display profile is based on whether a communication with the contact is inbound or outbound.

13. The method of claim 1, wherein the plurality of personalized configuration profiles comprises a first profile configured to be displayed on a mobile device, and a second profile configured to be displayed on a non-mobile device, the first profile comprising more types of context information than the second profile.

14. The method of claim 1 further comprising:
switching, by the processor, from the selected display profile to a second one of the plurality of display profiles, in response to a user command.

15. The method of claim 1 further comprising:
receiving, by the processor, identification of a recipient;
determining, by the processor, clearance level of the recipient;
redacting the context information displayed on the user device; and
transferring the redacted context information to a display device of the recipient.

16. A system for displaying context information on a user device accessible to a user, the system including:
a processor; and
a memory, wherein the memory has stored thereon instructions that, when executed by the processor, cause the processor to:
identify a triggering event associated with a contact;
identify at least one of an attribute associated with the contact or the user;
select a display profile of a plurality of display profiles based on the identified attribute, wherein each of the plurality of display profiles is preset and stored in association with the user, and each of the plurality of display profiles define a display configuration, wherein the display configuration includes identification of a type of context information to be displayed to the user;
identify the context information associated with the type of context information defined by the selected display profile;
retrieve the context information and display the context information on the user device according to the display configuration defined by the selected display profile;
customize the selected display profile in response to a user command;
identify a second display device accessible to the user;
select a second display profile of the plurality of display profiles for the second display device; and
switch display of the context information from the user device to the second display device, wherein the context information is displayed on the second display device according to the display configuration defined by the second display profile.

17. The system of claim 16, further causing the processor to send context information to another user.

18. The system of claim 16, wherein the attribute of the contact includes at least one of a name, a photograph, an address, a telephone number, an email address, or a business value.

19. The system of claim 16, wherein the attribute of the user includes at least one of an identity of the user, a role of the user, an identification of the user device, a geolocation of the user, and a confidentiality clearance level.

20. The system of claim 16, wherein the triggering event is an incoming communication from the contact or outgoing communication to the contact, wherein either the incoming or outgoing communication includes voice call, voicemail, electronic mail, chat, or SMS.

* * * * *